United States Patent [19]

Eberly, Jr.

[11] 4,038,177

[45] July 26, 1977

[54] OIL HYDRODESULFURIZATION WITH ALUMINA COMPOSITE CATALYST UTILIZING ALUMINATE AND DICARBOXYLIC ACID IN ITS PREPARATION

[75] Inventor: Paul E. Eberly, Jr., Baton Rouge, La.

[73] Assignee: Exxon Research and Engineering Company, Linden, N.J.

[21] Appl. No.: 706,217

[22] Filed: July 19, 1976

[51] Int. Cl.² ............................................. C07G 23/02
[52] U.S. Cl. ..................................... 208/216; 252/465
[58] Field of Search ......................................... 208/216

[56] References Cited

U.S. PATENT DOCUMENTS

| 3,810,830 | 5/1974 | Van Klinken et al. ............... 208/216 |
| 3,905,916 | 9/1975 | Riley et al. ............................ 208/216 |

*Primary Examiner*—George Crasanakis
*Attorney, Agent, or Firm*—Marthe L. Gibbons

[57] ABSTRACT

A catalyst is provided which comprises a hydrogenation component composited with an alumina support prepared by reacting an alkali metal aluminate with an aliphatic dicarboxylic acid, e.g. oxalic acid.

7 Claims, No Drawings

OIL HYDRODESULFURIZATION WITH ALUMINA COMPOSITE CATALYST UTILIZING ALUMINATE AND DICARBOXYLIC ACID IN ITS PREPARATION

BACKGROUND OF THE INVENTION

1. Field of the Invention

This invention relates to a catalyst and process for hydrotreating mineral oils. More particularly, this invention relates to a catalyst comprising a hydrogenation component composited with an alumina support characterized by its method of preparation.

2. Description of the Prior Art

Hydrodesulfurization processes in which heavy hydrocarbon distillates or residual fractions are hydrotreated with hydrogen in the presence of a catalyst comprising a hydrogenation component composited with a refractory oxide support, such as alumina, are well known. See, for example, U.S. Pat. No. 3,531,389; U.S. Pat. No. 3,569,044 and U.S. Pat. No. 3,770,618.

Hydrotreating catalysts having specified physical characteristics, such as pore size distribution, have been proposed to overcome the disadvantages of conventional prior art catalysts.

U.S. Pat. No. 3,917,808 discloses a process for producing an alumina extrudate by mixing alpha alumina monohydrate with a monoprotic acid and a polyprotic acid (including oxalic acid).

It has now been found that a hydrotreating catalyst comprising an alumina carrier having specific characteristics resulting from its method of preparation provides advantages that will become apparent in the ensuing description.

The term "hydrotreating process" is intended herein to designate a process in which a hydrocarbon feedstock is contacted with a cayalyst in the presence of hydrogen and under selected conditions to remove heteroatoms such as sulfur, nitrogen, oxygen and metallic contaminants such as nickel, vanadium and iron, from the feedstock and/or to saturate aromatic hydrocarbons and/or olefinic hydrocarbons in the feedstock and/or to hydrocrack the feedstock.

SUMMARY OF THE INVENTION

In accordance with the invention, there is provided, in a process of hydrotreating a sulfur-containing hydrocarbon oil which comprises contacting said oil at hydrotreating conditions with hydrogen and a catalyst comprising an alumina-containing support composited with a hydrogenation component, said hydrogenation component comprising as least one Group VIB metal component and at least one Group VIII metal component, the improvement which comprises said alumina having been prepared by the steps which comprise reacting a solution of an aluminate selected from the group consisting of alkali metal aluminates and ammonium aluminate with an aqueous solution of an aliphatic dicarboxylic acid.

In accordance with another embodiment of the invention, there is provided a catalyst comprising an alumina-containing support composited with a hydrogenation component selected from the group consisting of at least one Group VIB metal component and at least one Group VIII metal component, said alumina having been prepared by the steps which comprise reacting a solution of an aluminate selected from the group consisting of alkali metal aluminates and ammonium aluminate with an aqueous solution of an aliphatic dicarboxylic acid.

In accordance with another embodiment of the invention, there is provided an alumina prepared by the steps which comprise; (a) reacting a solution of an aluminate selected from the group consisting of alkali-metal aluminates and ammonium aluminate with an aliphatic dicarboxylic acid to produce a hydrous aluminum oxide, and (b) calcining the hydrous aluminum oxide to produce alumina.

DESCRIPTION OF THE PREFERRED EMBODIMENTS

A sulfur-containing hydrocarbon feedstock is contacted in a hydrotreating zone with hydrogen and the catalyst of the present invention at hydrotreating conditions to produce a hydrocarbon product having a reduced content of sulfur. The process of the present invention is particularly well suited for the hydrodesulfurization and hydrodemetallization of heavy sulfur-bearing mineral oils which usually also contain a high content of metallic contaminants.

HEAVY HYDROCARBON FEEDSTOCKS

The heavy hydrocarbon feedstock utilized in the present invention comprises hydrocarbons boiling above 650° F. (343.33° C.) at atmospheric pressure which contain substantial quantities of material boiling above 1,000° F. (537.78° C.). The process is particularly suited for treating heavy crude mineral oils, residual petroleum oil fractions, such as fractions produced by atmospheric and vacuum distillation of crude oils. Such residual oils usually contain large amounts of sulfur and metallic contaminants such as nickel and vanadium. The total metal content of such oils may range up to 2,000 weight parts per million or more and the sulfur content may range up to 8 weight percent or more. The Conradson carbon residue of these heavy hydrocarbon feeds will generally range from about 5 to about 50 weight percent (as to Conradson carbon residue, see ASTM test D-189-65). The preferred process feedstock is a petroleum residuum obtained from distillation or other treating or separation process. From about 30 to about 100 percent of the petroleum residuum feed boils above 900° F. (482.22° C.) at atmospheric pressure. Other suitable feedstocks include heavy hydrocarbons recovered from tar sands; synthetic crude oils recovered from oil shales; heavy oils produced from the liquefaction of coal, and the like, and mixtures of any of these feeds. The hydrocarbon feeds will generally contain at least 10 percent of materials boiling above 1,000° F. (537.78° C.) (at atmospheric pressure).

OPERATING CONDITIONS OF THE HYDROTREATING ZONE

Suitable operating conditions in the hydrotreating zone are summarized in the following table:

| Conditions | Broad Range | Preferred Range |
|---|---|---|
| Temperature, ° F. | 500–900° F. | 650–800 |
| Pressure, psig | 600–3500 | 800–3200 |
| Liquid hourly space Velocity, V/V/Hr. | 0.05–5.0 | 0.10–2.5 |
| Hydrogen Rate, SCF/bbl. | 300–20,000 | 600–12,000 |
| Hydrogen Partial Pressure | 500–3000 | 800–2500 |

THE HYDROTREATING CATALYST

The hydrotreating catalyst of the present invention utilized in the hydrodesulfurization zone comprises a hydrogenation component and an alumina-containing support. Commercially available alumina is typically prepared by neutralizing sodium aluminate with an aqueous solution of sulfuric acid ($H_2SO_4$) or $Al_2(SO_4)_3$ or mixtures thereof. In accordance with the present invention, instead of $H_2SO_4$ or $Al_2(SO_4)_3$, an aqueous solution comprising an organic aliphatic dicarboxylic acid is used to neutralize an alkali metal aluminate or an ammonium aluminate and thereby precipitate a hydrous aluminum oxide. Preferably the aluminate used is sodium aluminate. Organic acids suitable for use in preparing the alumina of the present invention include saturated aliphatic dicarboxylic acids, and unsaturated aliphatic dicarboxylic acids, preferably $C_2$ to $C_6$ dicarboxylic acids, such as ethanedioic (oxalic acid), propanedioic acid, butanedioic acid, and cisbutenedioic acid (maleic acid). The preferred dicarboxylic acid is ethanedioic acid (oxalic acid).

To prepare the alumina of the present invention an alkali metal aluminate or ammonium aluminate source is dissolved in water. For simplicity of description, the preparation of the alumina will be described hereinafter with reference to sodium aluminate. Sodium hydroxide may be added to promote the solubilization of the sodium aluminate in the water. One method of obtaining a solution of sodium aluminate is to dissolve alumina trihydrate in an aqueous solution of sodium hydroxide so as to cause the following reaction to occur:

$$Al_2O_3 \cdot 3H_2O + 2NaOH \rightarrow 2NaAlO_2 + 4H_2O$$

The molar ratio of NaOH to $Al_2O_3 \cdot 3H_2O$ may range from about 2:1 to 5:1, preferably from about 2:1 to 3:1. The molar ratio of water to aluminum trihydrate ranges from the amount necessary to essentially completely solubilize the sodium aluminate up to values of 500 or more moles of water per mole of aluminum trihydrate. To this sodium aluminate solution is added a solution of ethanedioic acid (oxalic acid) so as to lower the pH to a range of about 7 to about 9, preferably from about 8.5 to about 9. This addition may occur within a time interval of about 5 minutes or less to several hours at a temperature from ambient temperature (e.g. 60° F.) up to the boiling point of the solution, preferably from about 80°. to about 150° F. The neutralization takes place according to the equation:

$$2NaAlO_2 + H_2C_2O_4 + 2H_2O \rightarrow 2Al(OH)_3 + Na_2C_2O_4$$

Desirably, the molar ratio of $H_2C_2O_4$ to alumina trihydrate will be at least the theoretical ratio, that is, 1:1. The ratio may be higher depending on the amount of excess NaOH added to the mixture.

The above prepared alumina, after washing, filtering, drying and calcination at a temperature ranging from about 500° to about 1200° F. for a time period ranging from about 1 to about 24 hours, is composited with a hydrogenation component in a conventional manner, such as, for example, by impregnation of the alumina with a solution of the desired metallic components. The metal-impregnated alumina is thereafter usually calcined and may be reduced and/or sulfided to convert the metallic components to an active form. As previously stated, although sodium aluminate was described as the aluminate utilized, other alkali metal aluminates or ammonium aluminate may be used as starting material.

The preferred hydrogenation component of the catalysts of the present invention is selected from the group consisting of at least one elemental metal, metal oxide or metal sulfide of a Group VIB metal and at least one elemental metal, metal oxide or metal sulfide of a Group VIII metal of the Periodic Table of Elements. The Periodic Table referred to herein is in accordance with the *Handbook of Chemistry and Physics* published by the Chemical Rubber Publishing Company, Cleveland, Ohio, 45th edition, 1964. The preferred Group VIB metal component is selected from the group consisting of molybdenum oxide, molybdenum sulfide, tungsten oxide, tungsten sulfide and mixtures thereof and the preferred Group VIII metal component is selected from the group consisting of nickel oxide, nickel sulfide, cobalt oxide, cobalt sulfide and mixtures thereof. The support of the catalyst is an alumina-containing support, that is, the support is predominantly alumina prepared as indicated above which may be composited with minor amounts of other inorganic oxides such as silica. Preferably, the support consists essentially of alumina.

When the catalyst contains metal oxide hydrogenation components, the catalyst is preferably sulfided prior to use in a conventional way.

Suitable ranges of hydrogenation component include from about 5 to about 30 weight percent, preferably from about 10 to about 30 weight percent of a Group VIB metal component, calculated as the metal oxide based on the total catalyst, and from about 1 to about 15 weight percent, preferably from about 2 to about 10 weight percent of a Group VIII metal component calculated as the metal oxide based on the total catalyst. A preferred catalyst composition is as follows:

| Catalyst Composition | Broad Range | Preferred Range |
|---|---|---|
| Nickel or cobalt (as oxide), wt. % | 1 to 15 | 2 to 10 |
| Tungsten or molybdenum (as oxide), wt. % | 5 to 30 | 10 to 30 |
| Alumina | Balance | Balance |

The hydrogenation component can be composited with the alumina support in a conventional manner, such as, for example, by impregnating alumina prepared in accordance with the process of the present invention with salts of the desired hydrogenation metals. The following examples are presented to illustrate the invention.

EXAMPLE 1

A conventional catalyst, hereinafter to be designated catalyst A, was prepared as follows:

A sodium aluminate solution was prepared first by dissolving 104 grams of NaOH in 104 ml. of water. This solution was heated to 212° F. and then 136 grams of $Al_2O_3 \cdot 3H_2O$ were added to it and the resulting slurry was stirred until solubilization occured. The resulting solution will hereinafter be designated solution I. In another container, 5500 ml. of deionized water were heated to 117° F. To this water, 3.4 ml. of a 50% gluconic acid (i.e. pentahydroxyhexoic acid) solution were added. This solution will hereinfter be designated solution II.

Solution I was then added to Solution II and thoroughly mixed. The resulting solution will hereinafter be designated solution III. Neutralization was started by adding 865 ml. of a 7.5% $H_2SO_4$ solution (95 ml. conc. $H_2SO_4$ + 1900 ml. $H_2O$) to solution III. This addition was made dropwise over a period of 27 minutes. The final pH of the resulting solution was about 10.7. The neutralization was then completed by adding 640 ml. of $Al_2(SO_4)_3$ solution (358.4 grams $Al_2(SO_4)_3 \cdot 18H_2O$ plus 1641.6 grams $H_2O$). This addition was made over a period of 33 minutes until the pH was between 8.8 and 9.0. An addition 87 ml. of a 10% NaOH solution had to be added to maintain the pH above 8.8. The mixture was cooled and filtered. The recovered solid was washed with distilled water and then spray dried. The alumina was then extruded and calcined for 3 hours at 1000° F. The molybdenum oxide was incorporated by dissolving 13.9 grams of ammonium heptamolybdate [$(NH_4)_6Mo_7O_{24} \cdot 4H_2O$] in a sufficient amount of water to make 53 ml. of solution. A small amount of $NH_4OH$ was added for substantially complete solubility.

This addition was made by the incipient wetness technique to 75.7 grams of the previously extruded alumina. After impregnation, the solid material was dried and calcined 3 hours at 1000° F. Then 11.30 grams of Co($NO_3)_2 \cdot 6H_2O$ were dissolved in a sufficient amount of water to make 53 ml. of solution. This solution was added to the above prepared impregnated and calcine solid material by the incipient wetness technique. The resulting solid material was then dried in a vacuum oven at 150° F. for 16 hours. The resulting catalyst (A) comprised 3.2 wt. % CoO and 12.6 wt. % $MoO_3$, the balance being $Al_2O_3$. Prior to testing, the catalyst was calcined for 3 hours at 1000° F. and sulfided with a mixture of 10% $H_2S$ in $H_2$ at 750° F.

EXAMPLE 2

A catalyst, hereinafter to be designated catalyst B, was prepared in accordance with the process of the present invention.

Catalyst B was prepared in an identical manner to that described for catalyst A of Example 1, except that ethanedioic acid (oxalic acid) was used as the neutralizing agent instead of the combination of $H_2SO_4$ plus $Al_2(SO_4)_3$. To a sodium aluminate mixture, prepared as in Example 1, solution of 185 grams of ethanedioic acid dissolved in 2000 ml. of water was added at a rate of 30 ml. per minute until the pH was 8.8. The solid was then filtered, washed, dried and calcined at 1000° F. The extrusion of the alumina and impregnation with catalytically active metals were accomplished in the same manner as that described in Example 1.

The resulting catalyst (B) comprised 3.2% CoO, 12.6 wt. % $MoO_3$, the balance being $Al_2O_3$. Prior to testing, the catalyst was calcined for 3 hours at 1000° F. and sulfided with a mixture of 10% $H_2S$ in $H_2$ at 750° F.

The physical characteristics of catalysts A and B are shown in Table I.

TABLE I
PHYSICAL CHARACTERIZATION OF CATALYSTS

|  | Catalyst A | Catalyst B |
|---|---|---|
| Total Pore Volume, $cm^3/g$. | 0.463 | 0.848 |
| Total Surface Area, $M^2/g$. | 277 | 311.7 |
| 4 PV/SA | 67 | 109 |
| Pore Radius, A | $cm^3/g$. | $cm^3/g$. |
| 100,000–50,000 | 0.0000 | 0.0000 |
| 50,000–10,000 | 0.0011 | 0.0002 |

TABLE I-continued
PHYSICAL CHARACTERIZATION OF CATALYSTS

|  | Catalyst A | Catalyst B |
|---|---|---|
| 10,000–5,000 | 0.0007 | 0.0004 |
| 5,000–1,000 | 0.0014 | 0.0607 |
| 1,000–900 | 0.0001 | 0.0229 |
| 900–800 | 0.0001 | 0.0281 |
| 800–700 | 0.0002 | 0.0389 |
| 700–600 | 0.0002 | 0.0361 |
| 600–500 | 0.0003 | 0.0431 |
| 500–400 | 0.0004 | 0.0422 |
| 400–300 | 0.0006 | 0.0468 |
| 300–250 | 0.0004 | 0.0254 |
| 250–200 | 0.0006 | 0.0280 |
| 200–150 | 0.0029 | 0.0191 |
| 150–100 | 0.0112 | 0.0414 |
| 100–90 | 0.0056 | 0.0143 |
| 90–80 | 0.0085 | 0.0181 |
| 80–70 | 0.0138 | 0.0235 |
| 70–60 | 0.0230 | 0.0312 |
| 60–50 | 0.0435 | 0.0414 |
| 50–45 | 0.0341 | 0.0254 |
| 45–40 | 0.0476 | 0.0291 |
| 40–35 | 0.0553 | 0.0300 |
| 35–30 | 0.0552 | 0.0299 |
| 30–25 | 0.0543 | 0.0304 |
| 25–20 | 0.0513 | 0.0376 |
| 20–15 | 0.0508 | 0.1037 |

EXAMPLE 3

Catalysts A and B were utilized to hydrotreat a Cold Lake Crude oil at 750° F., 2250 psig, at a space velicity of 1 V/V/Hr. and 6000 standard cubic feet of hydrogen per barrel of oil.

Results of these tests are summarized in Table II.

TABLE II
HYDROTREATING OF COLD LAKE CRUDE OIL AT 750° F., 2250 PSIG, 1 V/V/HR. AND 6000 SCF $H_2$/B

| Catalyst | A | B |
|---|---|---|
| % Removals |  |  |
| Sulfur | 88.2 | 86.7 |
| Nickel | 66.2 | 86.9 |
| Vanadium | 68.2 | 96.2 |
| 2-K Rate Constants |  |  |
| (V/V/Hr. Basis), $hr^{-1}$ |  |  |
| Sulfur | 1.52 | 1.42 |
| Nickel | 0.52 | 1.43 |
| Vanadium | 0.58 | 2.62 |
| Sulfur 1.5 Order $K_1$ (W/Hr./W Basis), hr.- |  |  |

As can be seen from the data in Table II, catalyst B, which is a catalyst in accordance with the present invention, showed a demetallization activity 2.8 and 4.5 times higher than the prior art catalyst A for nickel and vanadium removal, respectively.

What is claimed is:

1. In a process of hydrotreating a sulfurcontaining heavy hydrocarbon oil reduce the sulfur content thereof which comprises contacting said oil as hydrodesulfurization conditions with hydrogen and with a catalyst comprising aluminia and hydrogenation components composited with said alumina, said hydrogenation components are selected from the group consisting of at least one elemental metal, metal oxide and metal sulfide of a Group VI-B element of the Periodic Table of Elements and at least one elemental metal, metal oxide and metal sulfide of a Group VIII element of the Periodic Table of Elements the improvement which comprises said alumina having been prepared by the step which comprises reacting a solution of an aluminate selected from the group consisting of alkali metal aluminates and ammonium aluminate with an aqueous solution of an aliphatic dicarboxylic acid to precipitate a hydrous aluminum oxide.

2. The process of claim 1 wherein said dicarboxylic acid is selected from the group consisting of $C_2$ to $C_6$ saturated aliphatic dicarboxylic acids and $C_2$ to $C_6$ unsaturated aliphatic dicarboxylic acids.

3. The process of claim 1 wherein said dicarboxylic acid is selected from the group consisting of ethanedioic acid, propanedioic acid, butanedioic acid and cis-butenedioic acid.

4. The process of claim 1 wherein said hycarboxylic acid is ethanedioic acid.

5. The process of claim 1 wherein said aluminate is sodium aluminate.

6. The process of claim 1 wherein after said aluminate is reacted with said aqueous solution of an aliphatic dicarboxylic acid, the resulting hydrous aluminum oxide is calcined at a temperature ranging from about 500° to 1200° F.

7. The process of claim 1 wherein said hydrodesulfurization conditions include a temperature ranging from about 500° to 900° F. and a hydrogen partial pressure ranging from 500 to 3000 psig.

* * * * *

UNITED STATES PATENT OFFICE
CERTIFICATE OF CORRECTION

Patent No. 4,038,177  Dated July 26, 1977

Inventor(s) Paul E. Eberly, Jr.

It is certified that error appears in the above-identified patent and that said Letters Patent are hereby corrected as shown below:

Column 1, line 37, change "cayaltyst" to read --catalyst--.

Column 6, line 53, change "sulfurcontaining" to read --sulfur-containing--.

Column 6, line 54, after "oil", insert --to--.

Column 6, line 55, after "oil", change "as" to read --at--.

Column 6, line 57, change "aluminia" to read --alumina--.

Column 7, line 11, change "hycarboxylic" to read --dicarboxylic--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks